(12) United States Patent
Kawashima et al.

(10) Patent No.: US 9,840,133 B2
(45) Date of Patent: Dec. 12, 2017

(54) VEHICLE BACK DOOR STRUCTURE

(71) Applicant: TOYOTA JIDOSHA KABUSHIKI KAISHA, Toyota-shi, Aichi-ken (JP)

(72) Inventors: Mutsumi Kawashima, Nisshin (JP); Miho Mizukoshi, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/917,756

(22) PCT Filed: Nov. 18, 2014

(86) PCT No.: PCT/JP2014/080535
§ 371 (c)(1),
(2) Date: Mar. 9, 2016

(87) PCT Pub. No.: WO2015/076269
PCT Pub. Date: May 28, 2015

(65) Prior Publication Data
US 2016/0263973 A1   Sep. 15, 2016

(30) Foreign Application Priority Data
Nov. 22, 2013  (JP) .................................. 2013-242237

(51) Int. Cl.
*B60J 5/10* (2006.01)
*H05B 3/84* (2006.01)

(52) U.S. Cl.
CPC ................ *B60J 5/107* (2013.01); *H05B 3/84* (2013.01); *H05B 2203/011* (2013.01); *H05B 2203/014* (2013.01)

(58) Field of Classification Search
CPC ...... B60J 5/107; H05B 3/84; H05B 2203/011; H05B 2203/014
See application file for complete search history.

(56) References Cited

U.S. PATENT DOCUMENTS

2006/0199903 A1   9/2006  Miyoshi et al.

FOREIGN PATENT DOCUMENTS

| JP | 2003-163522 A | 6/2003 |
|----|---------------|--------|
| JP | 2006-213798 A | 8/2006 |
| JP | 2007-186704 A | 7/2007 |
| JP | 2010-120521 A | 6/2010 |
| JP | 2012-111349 A | 6/2012 |

*Primary Examiner* — D Glenn Dayoan
*Assistant Examiner* — Melissa A Black
(74) *Attorney, Agent, or Firm* — Oliff PLC

(57) ABSTRACT

A concave portion, that is concave in a direction away from a back door glass, is formed at a facing wall of an outer member at a facing region that faces a bus bar portion. Due thereto, a gap between a bottom surface of the concave portion and the bus bar portion that is disposed at the back door glass can be made to be large.

3 Claims, 2 Drawing Sheets

VEHICLE BACK DOOR STRUCTURE

TECHNICAL FIELD

The present invention relates to a vehicle back door structure.

BACKGROUND ART

Japanese Patent Application Laid-Open (JP-A) No. 2012-111349 discloses a technique in which a sealing material (an adhesive) is coated on an outer panel that structures a portion of a back door, and a hack door glass is fixed to the outer panel by this sealing material. Further, a water droplet passage is formed between this end portion side of the outer panel and the end portion side of the back door glass, and guides water droplets due to rain water or the like at the surface of the back door glass to a drainage members On the other hand, JP-A No. 20.10-120521 discloses a technique in which a back door glass having heat wires is mounted to a back door glass adhesion margin at the peripheral edge of a window frame portion of a back door main body, and the back door glass and a back door outer are joined.

SUMMARY OF INVENTION

Technical Problem

In view of the above-described circumstances, an object of the present invention is to obtain a vehicle back door structure that can suppress or prevent energizing of a defogger due to moisture that arises due to condensation.

Solution to Problem

In a first aspect of the present invention, there is provided a vehicle back door structure comprising: a back door that opens and closes an opening portion formed at a vehicle body rear portion; a back door glass that is adhered to an outer member that structures an outer panel of the back door; bus bar portions that are disposed at both end sides in a vehicle transverse direction of the back door glass, and that supply electricity to a plurality of heat wires that are formed along the vehicle transverse direction at the back door glass and are arrayed along a vehicle vertical direction; and set-apart portions that are formed at a facing wall that structures a portion of the outer member and that faces the back door glass, the set-apart portions fitting the bus bar portions, and the set-apart portions being set further apart from the back door glass than an adhesion surface to which the back door glass is adhered.

In the above-described structure, the back door glass is adhered to the outer member that structures the outer panel of the back door that opens and closes an opening portion funned at the vehicle body rear portion. The bus bar portions are disposed at the both end sides in the vehicle transverse direction of the back door glass. Electricity is supplied by these bus bar portions to the plural heat lines that are formed along, the vehicle transverse direction at the back door glass and that are arrayed along the vehicle vertical direction.

Here, the set-apart portions are provided at the facing wall that structures a portion of the outer member and that faces the back door glass. The set-apart portions face the bus bar portions, and are formed so as to be further apart from the back door glass than the adhesion surface to which the back door glass is adhered. Accordingly, at the set-apart portions, the gaps between the facing wall and the back door glass, are large. Due thereto, contact of water droplets, that are generated by condensation, with the bus bar portions can be avoided, In a second aspect of the present invention, in the first aspect of the present invention, the set-apart portion may be a bottom surface of a concave portion that is concave toward a direction away from the back door glass.

In accordance with the above-described structure, the set-apart portion is the bottom surface of a concave portion that is concave toward the direction away from the back door glass. Therefore, at the facing wall of the outer member, the portions at which the concave portion is not formed are closer to the back door glass side than the bottom surface of this concave portion is. Namely, due to the concave portion being formed at the facing wall of the outer member, plural bent portions are formed. Due thereto, the strength of the back door itself can be improved.

Ina third aspect of the present invention, second aspect of the present invention, peripheral side portions of the concave portion at the facing wall may be nearer to the back door glass than the adhesion surface is.

In the above-described structure, the peripheral side portions of the concave portion at the outer member are closer to the back door glass than the adhesion surface to which the back door glass is adhered. Due thereto, at the vehicle cabin inner side, the gap between the facing wall of the outer member and the back door glass can be made to be small.

In a fourth aspect of the present invention. in the second aspect or the third aspect of the present invention, the concave portion may be formed continuously along the vehicle vertical direction.

In the above-described structure, the concave portion is farmed continuously along the vehicle vertical direction, Therefore, in a case in which water droplets drop-down into the concave portion, these water droplets can be made to flow along the concave portion interior toward the vehicle lower side.

In a fifth aspect of the present invention, in any one of the first through fourth aspects of the present invention, the outer member may be formed of resin.

In the above-described structure, the outer member is formed of resin. Even if this resin is electrically conductive, energizing of the defoggers due to moisture generated by condensation can be suppressed or prevented.

Advantageous Effects of Invention

As described above, the first aspect of the present invention has the excellent effect that energizing of the defoggers due to moisture generated by condensation can be suppressed or prevented.

The second aspect of the present invention has the excellent effect that the back door can be formed of resin, and, due thereto, a decrease in cost can be devised.

The third aspect of the present invention has the excellent effect that the appearance from the vehicle cabin inner side can be improved.

The fourth aspect of the present invention has the excellent effect that the concave Portion is made to be a passage for water, and water droplets that have dropped-down into this concave portion can be made to now toward the vehicle lower side.

The fifth aspect of the present invention has the excellent effect that lightening of the weight of the vehicle can be devised as compared with a case in which the outer member is formed of metal.

DESCRIPTION OF EMBODIMENTS

A vehicle back door structure relating to an embodiment oldie present invention is described by using the drawings. Note that the vehicle longitudinal direction front side is indicated by arrow FR, the vehicle transverse direction right side is indicated by arrow RH, and the vehicle vertical direction upper side is indicated by arrow UP. Further, when longitudinal and vertical directions are used in the following description without being specified, they indicate the longitudinal of the vehicle longitudinal direction and the vertical of the vehicle vertical direction.

(Structure of Vehicle Back Door Structure)

Figure 1:
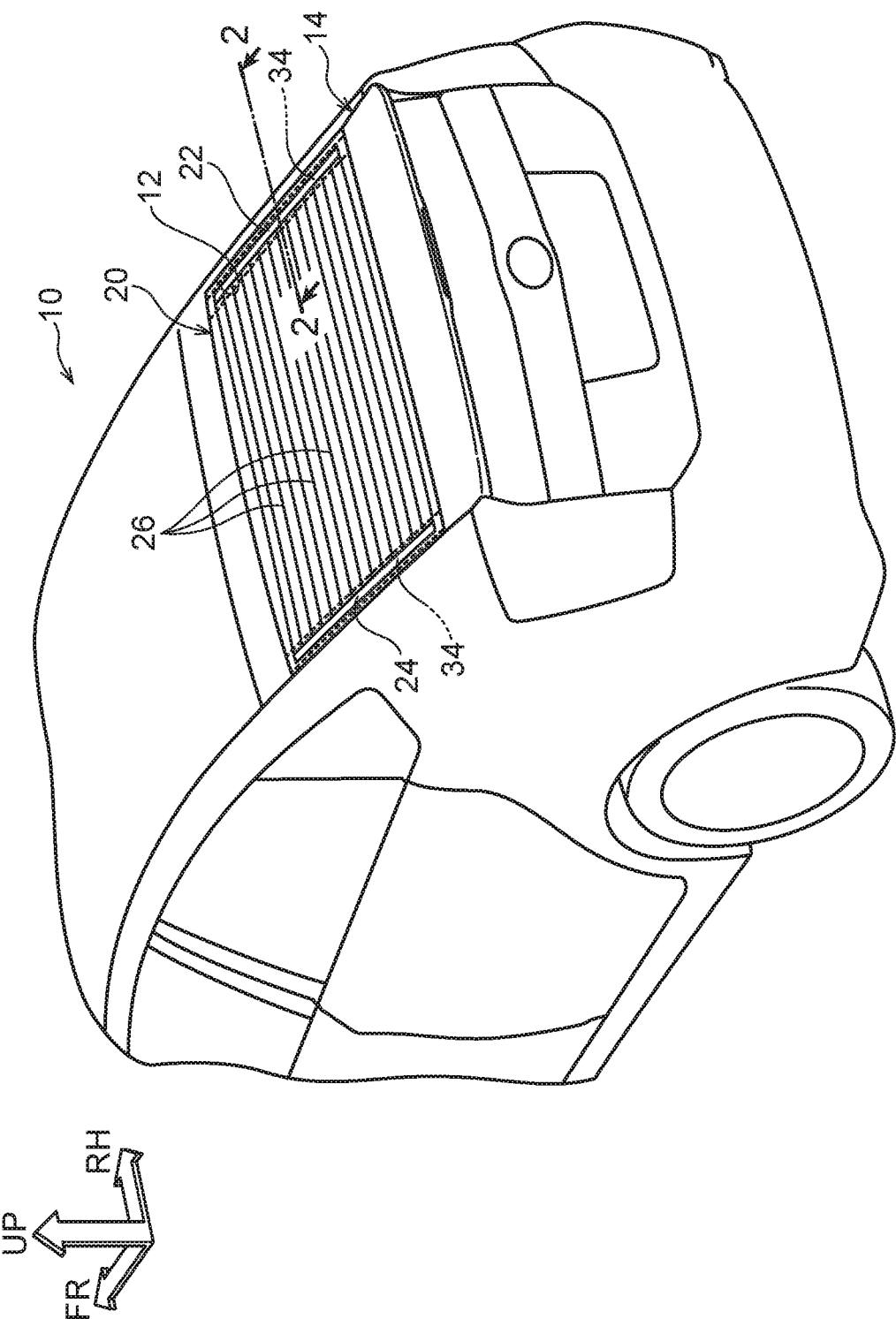
FIG. 1 is a perspective view in which a vehicle, to which a vehicle back door structure relating to a present embodiment is applied, is viewed obliquely from the left and the rear side.

As shown in FIG. 1, an opening portion 12 is formed at a rear end portion of a vehicle 10, and unillustrated door hinges are provided at the upper edge portion of this opening portion 12. A back door 14 that serves as a vehicle back door structure is rotatably supported by the door hinges, and the opening portion 12. can be opened and closed by this back door 14.

A back door glass 20 is mounted to the upper portion of the back door 14. Bus bar portions 22, 24 are disposed respectively at the vehicle transverse direction outer sides of the back door glass 20. Heat wires (defoggers) 26 are formed along the vehicle transverse direction between the bus bar portion 22 and the bus bar portion 24. These plural defoggers 26 are arrayed along the vehicle vertical direction.

Further, electricity is supplied to these defoggers 26 by the bus bar portions 22, 24. When the defoggers 26 are energized by the supply of electricity from the bus bar portions 22, 24, the defoggers 26 generate heat. Due thereto, the back door glass 20 is heated, and defogging and fogging prevention of the back door glass 20 are devised.

Figure 2:
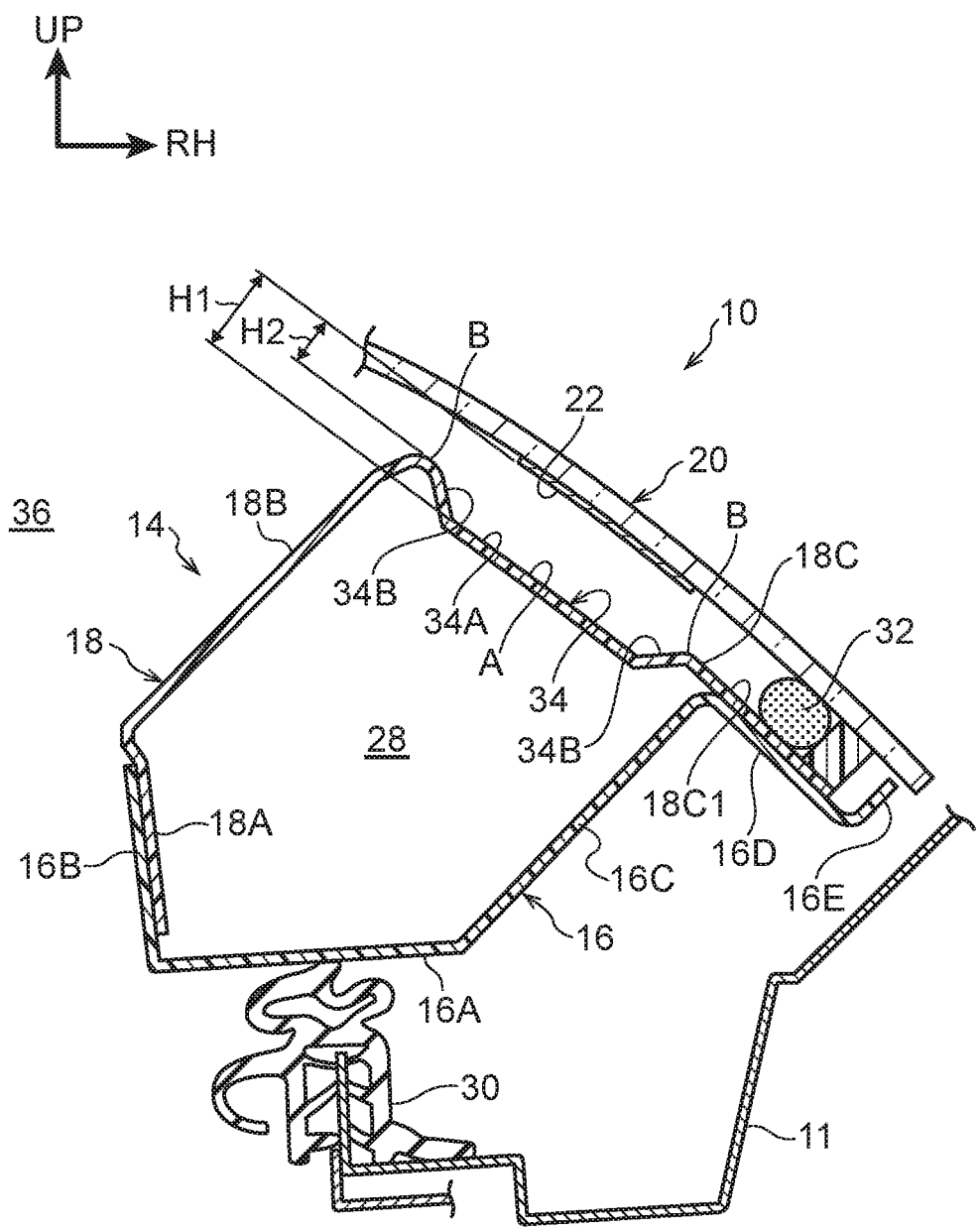
FIG. 2 is a vertical sectional view showing a state cut along line 2-2 of FIG. 1.

FIG. 2 is a cross-sectional view showing the state cut along line 2-2 of FIG. 1. As shown in this drawing, the back door 14 is structured to include an inner member 16 and an outer member 18 that are respectively formed of resin.

The inner member 16 is formed substantially in the shape of a rectangle whose upper side is open. A standing wall portion 16B, that extends-out upward from the vehicle transverse direction inner end portion of a bottom wall portion 16A that is disposed along the vehicle transverse direction, is provided at the vehicle transverse direction inner side of the inner member 16. An inclined wall 16C, that is inclined upward while heading toward the vehicle transverse direction outer side, extends-out from the vehicle transverse direction outer end portion of the bottom wall portion 16A. An inclined wall 16D, that is inclined downward while heading toward the vehicle transverse direction outer side, extends-out from the vehicle transverse direction outer end portion of the inclined wall 16C. Further, an outer edge wall 16E, that heads upward in a state of being substantially orthogonal to the inclined wall 16D, is formed at the vehicle transverse direction outer end portion of the inclined wall 16D.

On the other hand, the outer member 18 is formed substantially in the shape of a rectangle whose lower side is open. .A standing wall portion 18A, that can face the standing wall portion 16B of the inner member 16, is provided at the vehicle transverse direction inner side of the outer member 18. An inclined wall 18B, that is inclined upward while heading, toward the vehicle transverse direction outer side and that can face the inclined wall 16C of the inner member 16, is provided from the upper end portion of the standing wall portion 18A. Further, a facing wall 18C, that is inclined downward while heading toward the vehicle transverse direction outer side and that can face the inclined wall 16D of the inner member 16, is provided from the vehicle transverse direction outer end portion of the inclined wall 18B.

The standing wall portion 18A of the outer member 18 is joined and fixed via an adhesive (not shown) to the standing wall portion 16B of the inner member 16 in a state in which the standing wall portion 18A and the standing wall portion 16B face one another. hi this state, the outer side of the facing wall 18C at the outer member 18 can abut the inclined wall 16D of the inner member 16, and this facing wall 18C is joined and fixed to the inclined wall 16D via an adhesive (not shown), Due thereto, a closed cross-sectional portion 28 that is polygonal is formed between the inner member 16 and the outer member 18.

Further, a weather strip 30 that is mounted to a vehicle body 11 side can press-contact the bottom wall portion 16A of the inner member 16. Namely, in the state in which the back door 14 is closed, the inner member 16 is made to press-contact the weather strip 30, and the region between the hack door 14 and the vehicle body 11 is sealed.

Here, the back door glass 20 is joined and fixed, via an adhesive 32 that is a urethane adhesive or the like for example, to a top surface (adhesion surface) 18C1 of the outer edge portion of the facing wall 18C of the outer member 18. Namely, this facing wall 18C can face the back door glass 20.

Further, a concave portion 34, that serves as a set-apart portion and that is concave toward a direction away with respect to the back door glass 20, is formed at the facing wall 18C at a facing region A thereof that faces the bus bar portion 22. Peripheral side portions B of the concave portion 34 are closer to the back door glass 20 side than a bottom surface 34A of the concave portion 34 is More concretely, the peripheral side portions B of the concave portion 34 are nearer to the back door glass 20 side than the adhesion surface 18C1 is.

Further, the concave portion 34 extends along the vehicle vertical direction, and the cross-sectional shape thereof, that is cut along the vehicle transverse direction, is substantially rectangular. Further, side walls 348, that are inclined upward while heading toward the transverse direction outer sides from the transverse direction end portions of the bottom surface 34A of the concave portion 34, are respectively formed at the vehicle transverse direction outer sides of the concave portion 34.

(Operation/Effects of Vehicle Back Door Structure)

As described above, its the present embodiment, as shown in FIG. 2, the concave portion 34, that is concave in a direction away with respect to the back door glass 20, is formed at the facing wall 18C of the outer member 18 at the facing region A that faces the bus bar portion 22. Namely, the bottom surface 34A of the concave portion 34 is positioned further in the direction away from the back door glass 20 than the adhesion surface 18C1 of the back door glass 20.

Due thereto, a gap H1 between the bottom surface 34A of the concave portion 14 and the bus bar portion 22 that is disposed at the back door glass 20 can be made to be large. Accordingly, contact of water droplets, that are generated by condensation, with the bus bar portion 22 can be avoided. Due thereto, energizing of the defoggers 26 due to moisture that has arisen due to condensation can be suppressed or prevented. Note that, here, the bus bar portion 22 side is illustrated but the bus bar portion 24 (see FIG. 1) side as well is similar to the bus bar portion 22.

Further, although not illustrated, for example, in a case in which the gap between the outer member and the back door glass is enlarged, it is thought that the facing wall itself of the outer member will be moved away from the back door glass. However, in this case, the adhesive that adheres the back door glass can be seen from the vehicle cabin inner side, and, the appearance is not good. Therefore, a gap-filling member for closing this gap is separately needed at the vehicle cabin inner side, and the cost therefor is required. Further, by moving the facing wall itself of the outer member away from the back door glass, the cross-sectional surface area at the closed cross-sectional portion that is formed by the outer member and the inner member decreases, and possibility that the rigidity of the back door will decrease arises.

However, in accordance with the present embodiment, as shown in FIG. 2, by forming the concave portion 34 at the facing wall 18C of the outer member 18 at the facing region A that faces the back door glass 20, the gap H1 between the facing wall 18C and the back door glass 20 is increased. Therefore, at the outer member 18, at regions (the peripheral side portions 13 of the concave portion 34) other than the facing region A that faces the bus bar portion 22, a gap H2 at the vehicle cabin 36 inner side remains narrow. Accordingly, the appearance from the vehicle cabin 36 inner side is not marred. Further, hands entering or objects entering into this gap H2 can be suppressed or prevented.

Further, at the facing wall 18C of the outer member 18, the concave portion 34 is formed at the facing region A that faces the back door glass 20, and the peripheral side portions B of this concave portion 34 are nearer to the back door glass 20 side than the adhesion surface 18C1 is. Namely, due to the concave portion 34 being formed at the facing wall 18C of the outer member 18, at the peripheral side portions B of the concave portion 34, the facing wall 18C can be set nearer to the back door glass 20 side by an amount corresponding to the amount by which the cross-sectional surface area of the closed cross-sectional portion 28, that is formed by the outer member 18 and the inner member 16, has decreased. Due thereto, the cross-sectional surface area of this closed cross-sectional portion 25 not becoming smaller than needed can be suppressed. Accordingly, around the opening portion 12 (see FIG. 1) of the back door 14 that is structured by the outer member 1 and the inner member 16, a decrease in the cross-sectional secondary moment is suppressed, and the rigidity can be ensured.

Further, due to the concave portion 34 being formed continuously along the vehicle vertical direction, this concave portion 34 can be made to be a passage for water, and, in a case in which water droplets drop-down into the concave portion 34, these water droplets can be made to flow along the concave portion 34 interior toward the vehicle lower side.

Further, by forming this concave portion 34 at the outer member 18, plural bent portions (the side walls 34B and the bottom surface 34A) are formed. Due thereto, the strength of the back door 14 itself can be improved. Accordingly, this back door 14 can be formed of resin, and due thereto, a decrease in cost can be devised. Further, by forming the back door 14 of resin, lightening of the weight of the vehicle 10 can be devised as compared with a case in which this back door 14 is formed of metal.

Note that, in the present embodiment, the outer member 18 and the inner member 16 are formed of resin, but the outer member 18 and the inner member 16 may of course be formed of metal.

Further, in the present embodiment, at the outer member 18, the concave portion 34 is formed at the facing wall 18C that faces the back door glass 20. Although the cross-sectional shape, that is cut along the vehicle transverse direction, of this concave portion 34 is formed in a substantially rectangular shape, the concave portion 34 is not limited to this shape.

Further, in the present invention, it suffices for the set-apart portion, that is formed so as to be further apart from the back door glass 20 than the adhesion surface 18C1 to which the back door glass 20 is adhered, to be provided at the outer member 18. Therefore, this set-apart portion is not limited to the concave portion 34. For example, although not illustrated, a step portion that is in a state of being one step lower in the direction away from the adhesion surface 18C1, may be provided at the facing wall 18C of the outer member 18. Note that, in this case, there are cases in which a gap-filling member is needed.

Moreover, in the present embodiment, at the facing wall 18C of the outer member 18, the peripheral side portions B of the concave portion 34 are nearer to the back door glass 20 side than the adhesion surface 18C1 is. However, the peripheral side portions B of this concave portion 34 may, of course, be substantially flush with the adhesion surface 18C1.

Although an embodiment of the present invention has been described Above, the present invention is not limited to the above, and, of course, can be embodied by being modified in various ways other than the above within a scope that does not depart from the gist thereof.

The invention claimed is:
1. A vehicle back door structure comprising:
    a back door that opens and closes an opening portion formed at a vehicle body rear portion;
    a back door glass that is adhered to an outer member that structures an outer panel of the back door;
    bus bar portions that are disposed at both end sides in a vehicle transverse direction of the back door glass, and that supply electricity to a plurality of heat wires that are formed along the vehicle transverse direction at the back door glass and are arrayed along a vehicle vertical direction; and
    set-apart portions that are formed at a facing wall that structures a portion of the outer member and that faces the back door glass, the set-apart portions facing the bus bar portions, and the set-apart portions being set further apart from the back door glass than an adhesion surface to which the back door glass is adhered, wherein
    the set-apart portion is a bottom surface of a concave portion that is concave toward a direction away from the back door glass, and
    peripheral side portions of the concave portion at the facing wall are nearer to the back door glass than the adhesion surface is.
2. The vehicle back door structure of claim 1, wherein the concave portion is formed continuously along the vehicle vertical direction.

3. The vehicle back door structure of claim 1, wherein the outer member is formed of resin.

\* \* \* \* \*